(12) United States Patent
Huizenga

(10) Patent No.: US 6,848,818 B2
(45) Date of Patent: *Feb. 1, 2005

(54) VEHICLE HANDLE ASSEMBLY WITH CUP LIGHTING

(75) Inventor: David J. Huizenga, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/272,900

(22) Filed: Oct. 17, 2002

(65) Prior Publication Data
US 2003/0095416 A1 May 22, 2003

Related U.S. Application Data

(60) Provisional application No. 60/335,066, filed on Oct. 24, 2001.

(51) Int. Cl.⁷ ............................... F21S 8/10; F21V 8/00
(52) U.S. Cl. ..................... 362/501; 362/511; 362/543; 362/555
(58) Field of Search ................. 362/501, 511, 362/543, 544, 545, 551, 555

(56) References Cited

U.S. PATENT DOCUMENTS

| | | | | |
|---|---|---|---|---|
| 4,467,402 A | * | 8/1984 | Bauer et al. | 362/501 |
| 6,070,998 A | * | 6/2000 | Jennings et al. | 362/501 |
| 6,164,805 A | * | 12/2000 | Hulse | 362/501 |
| 6,550,946 B2 | * | 4/2003 | Misawa et al. | 362/501 |
| 6,561,667 B2 | * | 5/2003 | Stapf | 362/501 |
| 6,648,493 B2 | * | 11/2003 | Klein | 362/501 |

FOREIGN PATENT DOCUMENTS

JP         03032946 A   *  2/1991   ............ B60Q/3/02

* cited by examiner

*Primary Examiner*—Alan Cariaso
(74) *Attorney, Agent, or Firm*—Van Dyke, Gardner, Linn & Burkhart, LLP

(57) ABSTRACT

A handle assembly for a vehicle comprises a base portion adapted to mount to a vehicle and the base portion has a recessed portion that defines a finger cup area. The handle portion is movably mounted to the base portion and the handle portion is adapted for connecting a vehicle latching mechanism. A light assembly is incorporated into either the handle portion or the base portion for lighting the cup area when the light assembly is actuated. The light assembly conduits light from a light source and projects light in a light pattern whereby at least a portion of the cup area is illuminated with the light.

31 Claims, 3 Drawing Sheets

VEHICLE HANDLE ASSEMBLY WITH CUP LIGHTING

This application claims priority to provisional application Ser. No. 60/335,066, filed Oct. 24, 2001, entitled VEHICLE HANDLE ASSEMBLY WITH CUP LIGHTING, by David J. Huizenga, which claims priority from provisional application entitled VEHICLE HANDLE ASSEMBLY, Ser. No. 60/302,099, filed Jun. 30, 2001, by David J. Huizenga, which are incorporated by reference in their entireties herein.

TECHNICAL FIELD AND BACKGROUND OF THE INVENTION

The present invention relates to door handle assemblies and, more particularly, to vehicular door handle assemblies.

Until recently, door handle assemblies for vehicles have been principally mechanical devices whose sole function was to open the door of the vehicle. A typical door handle would include a handle portion, which is coupled to a latching mechanism, and a base about which the handle portion pivots to either latch or unlatch the latching mechanism. In addition, the base included a lock cylinder which is actuated by a key to lock or unlock the latching mechanism.

More recently, some vehicles have incorporated electrical components into the door or door handle assemblies to provide a key-less locking and/or unlocking device. The locking device may be operable in response to a keypad located at the door or a key fob carried by a driver or passenger of the vehicle. Passive entry systems have also been developed that are responsive to approach by a driver of the vehicle, whereby the system detects a signaling device held or carried by the approaching driver and automatically unlocks the door or doors of the vehicle. Such locking devices and systems function in connection with an antenna placed at the vehicle. The antenna may receive a signal from a remote device and operate a locking system or other system of the vehicle in response to the signal. Use of such an antenna allows the locking device to be adapted to permit remote unlocking of the vehicle, which is particularly useful in extreme weather conditions or in low light conditions, especially where safety may be a concern.

Therefore, the present invention, which provides illumination of the finger cup area of the handle assembly, provides even further enhanced vehicle security, especially in low light conditions.

SUMMARY OF THE INVENTION

The present invention provides a vehicle door handle assembly which includes a lighted cup area of the handle assembly base to provide enhanced security for the operator or passengers of the vehicle and in a manner that provides an enhanced appearance for the handle assembly and ease of manufacture and assembly.

According to one form of the invention, a vehicular door handle assembly includes a base portion and a handle portion, which is mounted to the base portion. The handle portion is movably mounted to the base portion and coupled to a latch mechanism of the door such that movement of the handle portion actuates the latch mechanism. The handle assembly further includes a light assembly incorporated in either the handle portion or the base portion, which conducts light from a light source and projects the light in a light pattern whereby at least a portion of the cup area of the base portion is illuminated.

In one aspect, the base portion includes the light assembly and, further, optionally includes a plurality of light assemblies.

In another aspect, the light assembly includes a light directing member for conduiting light from a light source for illuminating the cup area. For example, the light directing or conduiting member may comprise a light pipe, including, for example, an acrylic light pipe. In other aspects, the light assembly includes the light source, with the light directing member conduiting light from the light source when the light source is actuated for illuminating the cup area. For example, the light source may comprise a light emitting diode, a fluorescent light, an incandescent light, and electroluminescent light. Furthermore, the light source may comprise a plurality of light emitting diodes.

In yet a further aspect, the handle assembly includes a circuit board to power the light source. For example, the circuit board may include a power regulator circuit for regulating the voltage to the light source. Optionally, the light assembly may include the circuit board.

According to another form of the invention, a handle assembly for a vehicle includes a base portion, which includes a recessed portion defining a finger cup area, a handle portion, and a light assembly. The handle portion is movably mounted to the base portion and is operable for latching or unlatching a vehicle latching mechanism via movement of the handle portion relative to the base portion. The light assembly includes a light pipe that is adapted to direct light from at least one light source through the base portion for illuminating at least a portion of the cup area.

In one aspect, the light assembly includes the light source, with the light pipe directing light from the light source when the light source is actuated.

In yet another aspect, the base portion includes a coupler for securing the light assembly to the base portion. For example, the coupler may comprise a snap-fit coupler. Alternately, the light assembly may be molded with the base portion.

These and other objects, advantages, purposes, and features of the invention will become apparent upon review of the following description in conjunction with the drawings.

DETAILED DESCRIPTION OF THE PREFERRED EMBODIMENTS

Figure 1:
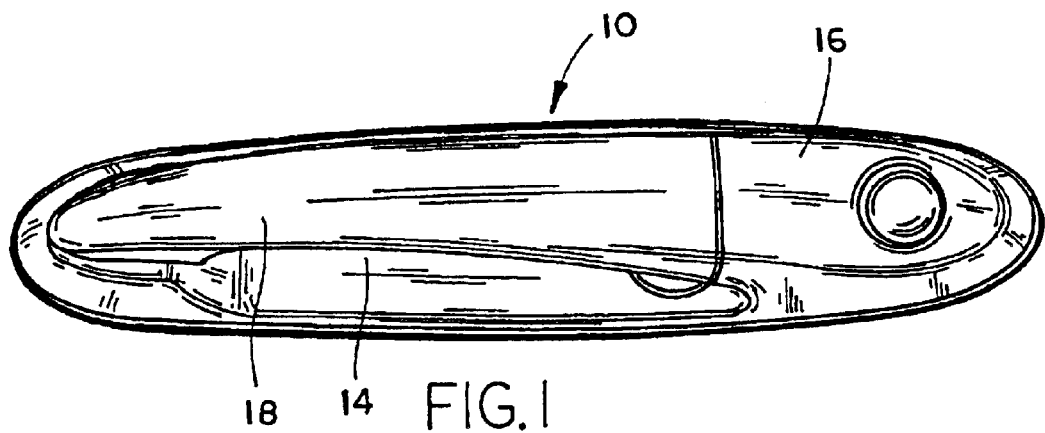
FIG. 1 is a perspective view of a handle assembly of the present invention.

Referring to FIG. 1, the numeral 10 generally designates a handle assembly of the present invention. As will be more fully described below, handle assembly 10 is adapted to be mounted to a vehicle, such as on a side door of the vehicle, and incorporates one or more light assemblies 12 for illuminating the cup area 14 of a base or fixed portion 16 of handle assembly 10 in a manner to ease manufacture and assembly and, further, in a manner to enhance the aesthetic appearance of the handle assembly.

Figure 3:
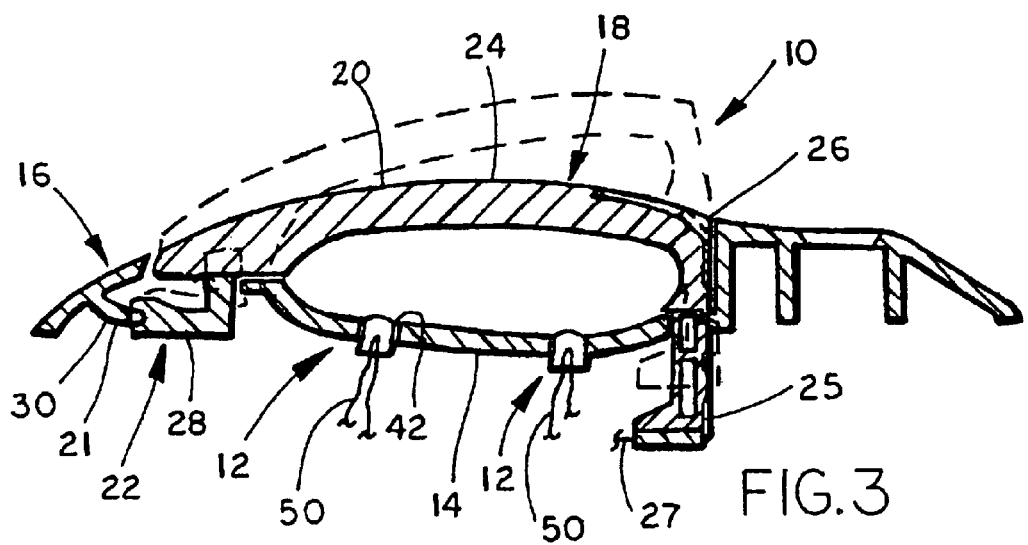
FIG. 3 is a cross-section view taken along line III—III of FIG. 1 illustrating the base portion of the light assembly incorporating a light assembly.

Handle assembly 10 includes a movable or handle portion 18, which is movably mounted to fixed portion 16 and is adapted to move between a home or un-actuating position (as shown in FIG. 3) and a pivoted or actuating position (as shown generally in phantom in FIG. 3). In the illustrated embodiment, movable portion 18 is a strap-type handle portion 20, which is pivotally mounted to fixed portion 16, and base portion 16 comprises a generally oval-shaped base portion. Handle portion 20 comprises a generally L-shaped member, with one end 22 of handle portion 20 pivotally mounted to base portion 16 about a vertical axis 21, and a second end 24 of handle portion 20 that is movable and can be lifted away from base portion 16 and the body of the vehicle when pulled. Distal or free end 25 of second end is 24 connected by a coupler 27, for example, a cable or a linkage or linkages, to a latching mechanism (not shown) located within the door of the vehicle. When handle portion 20 is pivoted about end 22, end 24 will lift and end 25 will pull on the cable or linkage (not shown) within the door of the vehicle to release latching mechanism and, thus, open the door of the vehicle from the outside of the vehicle.

Figure 2:
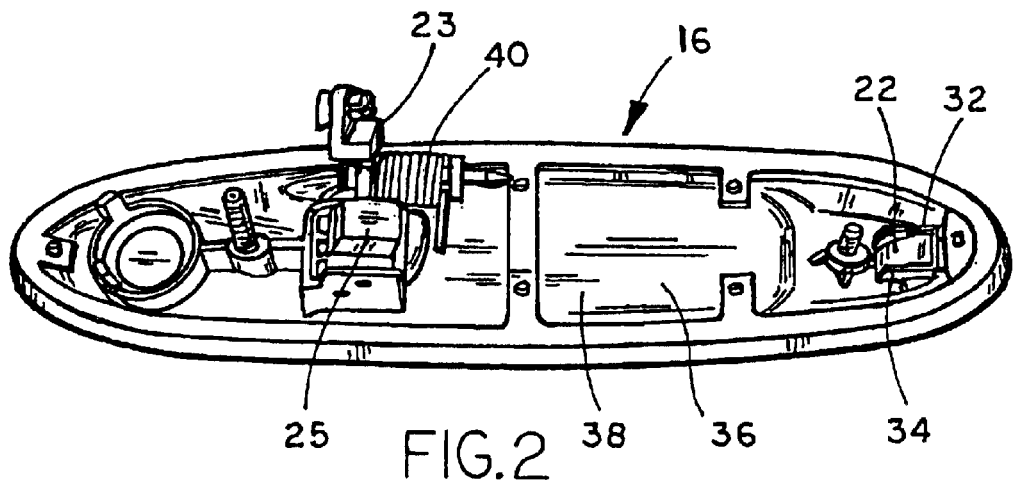
FIG. 2 is a bottom plan view of the handle assembly of FIG. 1.

As best seen in FIG. 3 and as noted above, handle portion 20 is generally L-shaped and includes a leg 26 that extends through base portion 16, with leg 26 including distal end 25. Referring to FIG. 2, leg 26 includes a linkage or cable mounting arm 23 connected thereto, which couples to coupler 27 and to a spring 40. Spring 40 applies a spring force to handle portion 20 to urge it to its home position. End 22 of handle portion 20 includes an L-shaped pivot member 28 which extends through base portion 16 and is pivotally mounted to a mounting flange 30 of base portion 16 about pivot axis 21. L-shaped pivot member 28 is captured on mounting flange 30 between a pair of webs 32 and 34 formed on back wall 36 of base portion 16 (FIG. 2). Beneath handle portion 20, back wall 36 includes a recessed or depressed portion 38, which forms cup area 14 that preferably extends above and below handle portion 20.

Handle portion 20 is preferably molded as a one-piece body and preferably molded from a substantially rigid and strong polymeric material, such as thermo-plastic or a thermo-set material, such as nylon. In addition, handle portion 20 may incorporate a soft touch surface, which is molded, for example to one or more surfaces of handle portion 20 by a thin film molding process, such as described in reference to co-pending application entitled VEHICLE DOOR HANDLE, U.S. Ser. No. 09/597,532, filed Jun. 20, 2000, now U.S. Pat. No. 6,349,450, which is incorporated by reference herein in its entirety. Base portion 16 is also preferably molded as a one-piece member from a substantially rigid and strong material, such as a thermo-plastic or thermo-set material. Preferable materials include engineering plastics, such as nylon, and preferably a mineral and/or glass filled nylon, such as Capron 8267, commercially available from Honeywell of Morristown, N.J., or Ultramid B3GM35, commercially available from BASF Aktiengesellschaft of Germany; glass filled Polycarbonate/Polybutylene Terephalate (PC/PBT), such as Xenoy, commercially available from General Electric Plastics—Polymers of Pittsfield, Mass.; non-filled PC/PBT, such as Xenoy NBX224, commercially available from General Electric Plastics—Polymers of Pittsfield, Mass.; and/or a Polyphenylene/Polyamid (PPE/PA) blend, such as Noryl GTX 902, also commercially available from General Electric Plastics—Polymers of Pittsfield, Mass., or any other such materials, such as ABS or ASA polymeric engineering plastics. Furthermore, the door handle may be decorated, such as by painting, or by an in mold film applique, using techniques such as described in U.S. patent application, Ser. No. 09/564,665, filed May 1, 2000 by Tun-Jen Chu for CONSOLIDATED EXTERIOR SIDEVIEW MIRROR ASSEMBLY INCORPORATING AN IN-MOLD FILM PROCESS, now U.S. Pat. No. 6,310,738, which is hereby incorporated herein by reference.

In addition, the handle assembly components, such as the handle portion or the base portion, are preferably manufactured in molding operations that impart such components with lightweight capability but while still maintaining their structural integrity and performance. Such lightweight molding methods can include an aerated injection molding process, such as the MUCELL™ process described in U.S. patent application Ser. No. 09/679,997, filed Oct. 15, 2000, now U.S. Pat. No. 6,669,267, which is herein incorporated by reference in its entirety. Alternately, blow molding can be used during molding of, for example, a plastic handle or base, so that the weight of the component is reduced thereby. Another benefit from using lightweight molded components is that the process requires a lower tonnage for the molding apparatus, which decreases the cost for production for example by increasing cycle times. Also, gas injecting molding (whereby a jet of gas is injected into the mold during molding to hollow out a part) or hydromolding (whereby a jet of water is introduced in the mold during molding) may be beneficially used when forming any of the molded components of the handle assembly of the present invention.

Referring again to FIG. 3, base portion 16 includes one or more light assemblies 12 for illuminating cup area 14. Light assembly 12 is positioned in an opening 42 formed in cup area 14 of base portion 16 and includes one or more light sources 44 and a light-directing or conducting member 46. Light assembly 12 may include a variety of sources 44, such as light emitting diodes (LEDs), including high current LEDs or the like, such as disclosed in copending U.S. Provisional Application Ser. No. 60/271,466, filed Feb. 26, 2001, which is incorporated by reference herein in its entirety, or may comprise electroluminescent lights, fluorescent lights, incandescent lights, including microincandescent lights, or the like. Alternately, as will be described more fully below, light may be conducted or delivered to a light conduiting or directing member from a remote light source, for example, by a light pipe or fiber optic cables or the like. In this manner, the light source may be remotely located from the light assembly and, furthermore, may be used to port light to more than one light assembly. In this manner, the light assembly would operate as a port and/or conduit.

Figure 4:
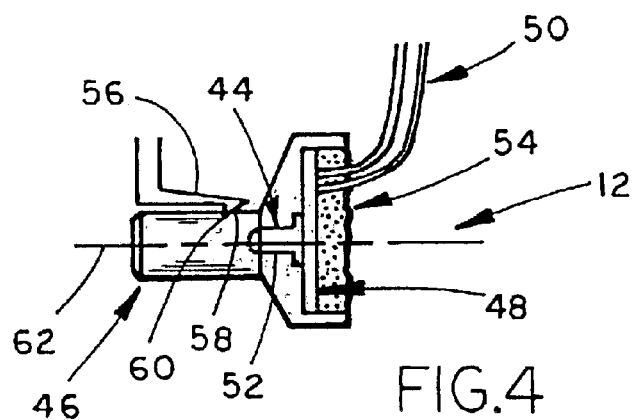
FIG. 4 is an enlarged view of the light assembly of FIG. 3.

Light directing member 46 may comprise a light pipe or lens which directs light from light source 44 through opening 42 for illuminating cup area 14. In addition, as will be more fully described below, light assembly 12 may include a plurality of light sources or may have light ported to the light directing member, for example, by a light pipe, optical fibers, or the like. Referring again to FIG. 4, in the illustrated embodiment, light assembly 12 includes a circuit board 48 which delivers power to light source 44 and on which light source 44 optionally is mounted. Light source 44 is powered through circuit board 48 by wiring 50 which is coupled to circuit board 48. Wires 50 extend and couple to the vehicle electrical system, for example, by a connector, which will be more fully described in reference to FIG. 6 below. Light source 44 is optically coupled to the light directing member 46 and may, for example, be inserted into a receptacle or cavity 52 formed, such as by molding, in light directing member 46. In addition, light source 44 and circuit board 48 may be held in place in cavity 52 with a potting material 54 to form a self-contained light assembly. Alternately, light source 44 may be molded with light directing member.

As noted above, light source 44 may comprise a light emitting diode and further may comprise a high intensity light emitting diode, such as described in copending provisional application entitled IMPROVED VEHICULAR LIGHTING SYSTEM, Ser. No. 60/315,384, filed Aug. 28, 2001. A single high-intensity LED may be used that comprises a single LED light source in a compact package or as an individual chip or circuit element (and with a diagonal size less than about 14 mm diagonal cross-sectional dimension when viewed from the light emitting side; more preferably less than about 8 mm; and most preferably, less than about 5 mm) that illuminates to emit a light beam when (powered at about 25 degrees Celsius or thereabouts) at least about 100 milliamps passes through the LED element (more preferably when at least about 225 milliamps passes through the LED element and most preferably when at least 300 milliamps passes through the LED element), and with a luminous efficiency of at least about 1 lumen/watt, more preferably at least about 3 lumens/watt, and most preferably at least about 7 lumens/watt. Single high-intensity LEDs suitable to use in the present invention include high-intensity, high-current capability light emitting diodes such as the high-flux LEDs available from LumiLeds Lighting, U.S., LLC of San Jose, Calif. under the SunPower Series High-Flux LED trade name. Such high-intensity LEDs comprise a power package allowing high-current operation of at least about 100 milliamps forward current, more preferably at least about 250 milliamps forward current, and most preferably at least about 350 milliamps forward current, through a single LED. Such high-current/high-intensity LEDs (as high as 500 mA or more current possible, and especially with use of heat sinks) are capable of delivering a luminous efficiency of at least about 1 lumen per watt, more preferably at least about 3 lumens per watt, and most preferably at least about 5 lumens per watt. Such high-intensity LEDS are available in blue, green, blue-green, red, amber, yellow and white light emitting forms, as well as other colors. Such high-intensity LEDs can provide a wide-angle radiation pattern, such as an about 30 degree to an about 160 degree cone. Typically, such high-intensity LEDs are fabricated using Indium Gallium Nitride technology. To assist heat dissipation and maintain the LED junction below about 130° Celsius (and more preferably below about 100 degrees Celsius and most preferably below about 70° Celsius), a heat sink can be used. Preferably, such a heat sink comprises a metal heat dissipater (such as an aluminum metal heat sink) with a surface area dissipating heat of at least about 1 square inch, more preferably of at least about 2.5 square inches, and most preferably of at least about 3.5 square inches. In addition, the high-intensity LED (for example, a single white light emitting LED passing about 350 mA and emitting white light with a luminous efficiency of at least about 3 lumens per watt, and with a light pattern of about 120 degrees or so) can be combined with a reflector element and a lens to form a high-intensity LED light module capable of directing an intense white light beam of light.

Circuit board 48 may optionally include a voltage regulator to step down the voltage from, for example, the vehicle electrical system, which is typically 12-volts and which may in the near future be 42-volts, to the voltage necessary to drive the light source. For example, in the case of a light emitting diode, the drive voltage will typically vary from about 1 to 4 volts. However, this voltage may change depending on the number of light sources coupled to the circuit board and, further, depending on the arrangement of the light sources. The light sources may be connected in series or in parallel or connected with a combination of both. As a result, the step-down voltage may vary considerably or in some cases may not be needed.

In addition, light assembly 12 may illuminate cup area 14 with a colored light, such as red, blue, or a color which matches the vehicle body paint or a contrasting color. It should be understood that the light produced by light sources 12 may or may not compliment the body of the vehicle. The color of the light may be produced by the light source itself or by a filter or by the color of the material forming light directory member 46.

In order to mount light assembly or light assemblies 12 in base portion 16, base portion 16 may include couplers, such as snap-fit couplers, for retaining light assembly 12 in opening 42. For example, in the illustrated embodiment, snap-fit couplers 56 comprise bayonet-type fingers which include camming surfaces 58 that when pressed against by light assembly 12 will deflect to permit light assembly 12 to be positioned in opening 42 but will flex back to engage the light assembly and optionally engage a retaining surface (for example a retaining surface 160 as will be more fully described in FIG. 5) which may be provided or otherwise formed on light assembly 12.

Optionally, light-directing member 46 includes one or more optical surfaces such as outer surface 62 which may be adapted to defuse or otherwise direct the light from light source 44 in a manner to fan outwardly to illuminate at least a portion of cup area 14.

Figure 4A:
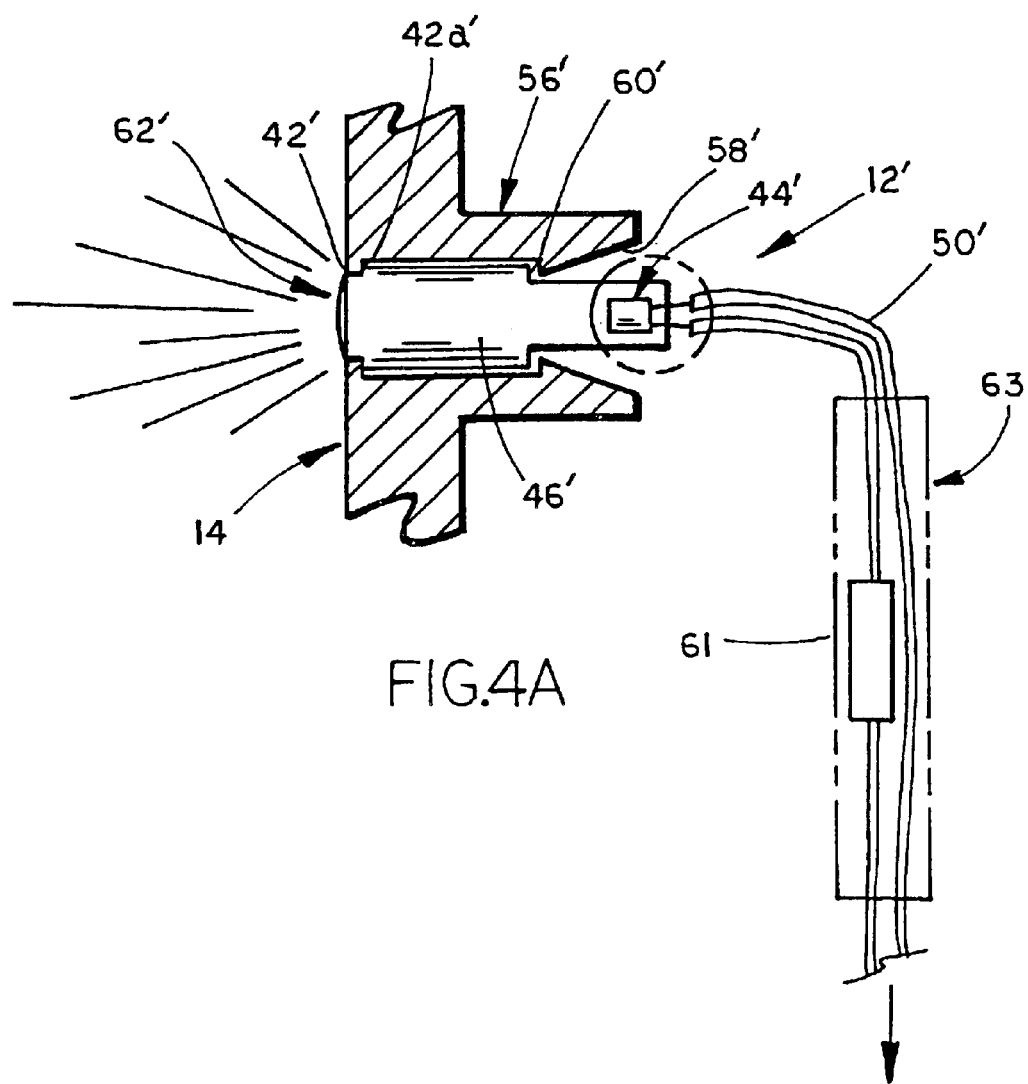
FIG. 4A is an enlarged view of another embodiment of the light assembly of FIG. 4.

Referring to FIG. 4A, light assembly 12' is of similar construction to light assembly 12 with the exception of the circuit board. Light assembly 12' includes a light directing member 46' (similar to light directing member 46) and a light source 44' (also similar to light source 44). In the illustrated embodiment, light source 44' is directly coupled to wires 50' for coupling to the electrical system of the vehicle. In this embodiment, wires 50' are harnessed in a tube 63 and may incorporate a resistor 61 to reduce the drive voltage to light source 44'. In addition, light directing member 46' is molded or otherwise formed with a step or recessed portion to form an engagement surface 60' for coupler 58'. Optionally, light directing member 46' may include a retaining shoulder formed around lens 62 which generally matches a retaining shoulder 42a' of opening 42' to thereby retain light assembly 12' in opening 42.

Figure 5:
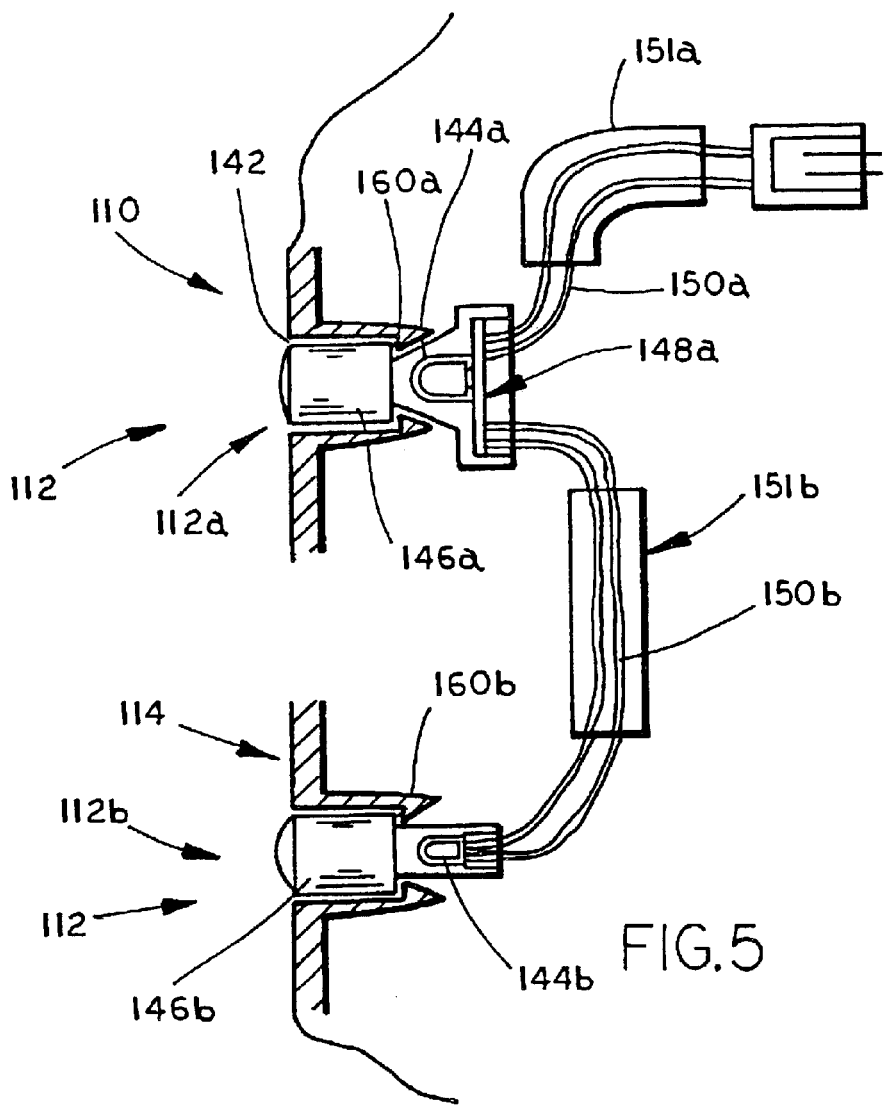
FIG. 5 is an enlarged view of a light assembly unit of the present invention.

Referring to FIG. 5, handle assembly 110, which is of similar construction to handle assembly 10, incorporates in cup portion 114 a plurality of light assemblies 112, which are mounted in openings 142. Light assemblies 112 may individually coupled to the vehicle electrical system or may be assembled as a unit. In the illustrated embodiment, handle assembly 110 includes a pair of light assembles 112a and 112b, with light assembly 112a incorporating a circuit board 146a and light assembly 112b coupling to the circuit board 146a of light assembly 112a by wiring 150b. Light assembly 112a is of similar construction to light assembly 12 and includes a light directing member 146a and a light source 144a and, further, circuit board 148a on which light source 144a is mounted. As noted previously, light source 144a may be just powered through circuit board 148a and need not necessarily be mounted to circuit board 148a. Similar to the previous embodiment, circuit board 148*a* may support various circuitry including a power regulator circuit, which steps down the voltage from the vehicle ignition system. Circuit board 148*a* couples to the vehicle electrical system by wiring 150*a*. Referring to FIG. 5, wires 150*a* are coupled to a connector, such as a standard two-pin connector, for coupling to the electrical system of the vehicle. Optionally, wiring 150*a* and wiring 150*b* may include shrink tubes 151*a* and 151*b*, respectively, to provide a wire management system for wires 150*a* and 150*b* that eases handling and installation of the light assembly unit. The light assemblies together with wiring 150*a*, 150*b* and the coupler, therefore, form a flexible light assembly unit that is relatively easy to manufacture and assemble. It should be understood that wiring 150*b* may alternately couple to the electrical system of the vehicle independently of light assembly 112*a*, with light assembly 112*b* optionally but preferably including its own circuit board.

As previously noted, light directing members 46, including light directing members 146*a* and 146*b*, may be ported light from remote light sources by light pipes or optical fiber bundles or the like. In which case, as previously noted, the light sources or light sources are remote from light assemblies 12 or 112. In a similar fashion to the wire management system depicted in FIG. 5, the optical fibers may be similarly grouped and bundled, by for example shrink tubes, with one set of optical fibers being directed to light directing member 146*a* and a second set of optical fibers being directed to light directing member 146*b*. In this manner, a single light source may provide light that is conducted to more than one light directing member.

Figure 6:
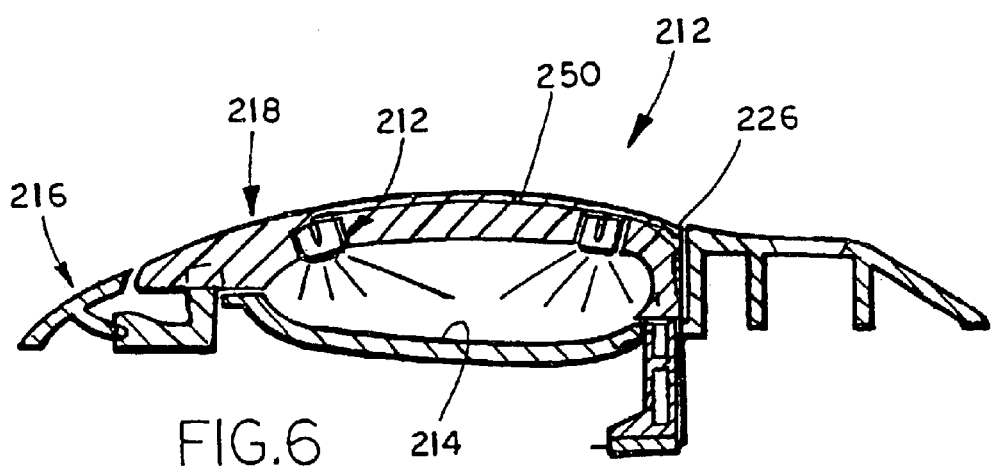
FIG. 6 is another embodiment of the handle assembly with the handle portion incorporating a light assembly.

Referring to FIG. 6, handle assembly 210 incorporates light assembles 212 in handle portion 218, with handle portion 218 including openings 242 directed inwardly towards cup area 214. In this application, the wiring 250 extends through handle portion 218 and through or along leg portion 226, which extends through base portion 216, to couple to the vehicle electrical system.

It should be understood from the foregoing, that the present invention provides a handle assembly which incorporates one or more light assemblies for illuminating the cup area of the handle assembly. Furthermore, given the flexible design of the light assemblies of the present invention, the light may be directed in a manner to match the concavity of the cup area. As noted above, the light assemblies may incorporate one or more light sources including, for example, light emitting diodes, incandescent lights, including microincandescent lights, fluorescent lights, electroluminescent lights, or the like or may direct light from a remote light source.

Preferably, illumination of the light source is deactivated after the vehicle is running. In addition, the circuit which powers the various light sources may include a lockout device, such as a lockout circuit, so that the light sources cannot be used while the vehicle is being driven. Such lockout circuits are conventional, and one such suitable circuit is described in U.S. Pat. No. 5,371,659, which is incorporated by reference in its entirety. Furthermore, the light sources may be activatable in response to a number of inputs. For example, the light sources may be actuated in response to signals from a sensor, such as a proximity sensor that detects when a person approaches the vehicle, for example, by detecting motion at or near the vehicle, such as at or near the side of the vehicle. Such detection may be via touching of the handle. Such a sensor may detect movement of the handle portion or insertion of a key into the lock cylinder of the door. A remote key-less entry device may also actuate the light sources. Preferably, the light sources are actuatable for a limited duration of time so that the light source is deactivated a period of time following activation of the light source. In this manner, the light source may be temporarily activated as a person approaches or contacts the handle, which eases the unlocking of the vehicle especially in low light conditions. As noted previously, handle assemblies incorporating electrically operated locks may include key pads located at the door, including key pads at the base of the handle assembly or, even more recently, at the handle portion of the handle assembly, which is described in co-pending U.S. provisional application, entitled VEHICLE HANDLE ASSEMBLY, Ser. No. 60/302,099, filed Jun. 30, 2001, by David J. Huizenga, which is incorporated by reference herein in its entirety. In, addition, co-pending U.S. provisional application, entitled VEHICLE HANDLE ASSEMBLY, Ser. No. 60/302,099, filed Jun. 30, 2001, by David J. Huizenga, discloses that the finger cup area of the handle assembly base can be illuminated by lights, which are incorporated into the handle portion and, for example, mounted to a circuit carrier that provides communication between the key pad and the locking mechanism. The illumination of the cup area assists the operator when trying to locate the handle assembly in low-light conditions and, therefore, provides enhanced security for operator of the vehicle.

These light sources may further provide ground illumination of the area by the vehicle, similar to the security light assemblies disclosed in U.S. Pat. Nos. 5,371,659, 5,669,699, 5,823,654 and 5,497,305, which are commonly assigned to Donnelly Corporation of Holland, Mich. and which are hereby incorporated herein by reference in their entireties. When activated, the light source preferably draws a low current from its power source, such as the vehicle battery. In this manner, the impact on the power source is minimized. Alternately or in addition, the light assembly or light assemblies of the present invention may flash in response to a security breach or in response to an occupancy detector, which may detect, for example when a person is in the vehicle or in the trunk of the vehicle. For example, if a person, such as a child, is accidentally locked in the vehicle, including the trunk of the vehicle, the light assembly or assemblies may flash. In addition, the light assembly or light assemblies may include more than one light source, as previously described—in which case the light assembly or assemblies may illuminate with one color for one situation or another color for another situation. For example, for emergency type situations the light or light assemblies may flash red or another color, while the light assembly or light assemblies would illuminate the cup area with another color, for example white light, for illumination purposes such as when the door is unlocked, such as by a key fob. Alternately, where the handle assembly incorporates more than one light assembly, the light assemblies may be allocated for different functions. For example, one light assembly may be allocated for illuminating the cup area of the handle, while another light assembly may be allocated for flashing. Therefore, it is also contemplated that the light assemblies may have different colored light sources. For examples of suitable occupancy detectors with which the light assemblies of the present invention may be combined include U.S. patent application Ser. No. 09/275,565, filed Mar. 24, 1999, entitled SAFETY HANDLE FOR TRUNK OF VEHICLE, now U.S. Pat. No. 6,086,131, U.S. patent application Ser. No. 09/605, 233, filed Jun. 28, 2000, entitled ILLUMINATED SAFETY HANDLE FOR OPENING THE TRUNK OF A VEHICLE FROM INSIDE, now U.S. Pat. No. 6,254,261, U.S. patent application Ser. No. 09/516,831, filed Mar. 1, 2000, entitled SAFETY RELEASE FOR A TRUNK OF A VEHICLE, now U.S. Pat. No. 6,390,529, U.S. patent application Ser. No. 09/852,483, filed May 10, 2001, entitled SAFETY HANDLE FOR OPENING THE TRUNK OF A VEHICLE FROM INSIDE, now U.S. Pat. No. 6,460,906, U.S. patent application Ser. No. 09/648,560, filed Aug. 25, 2000, entitled SAFETY SYSTEM FOR A CLOSED COMPARTMENT OF A VEHICLE, now U.S. Pat. No. 6,485,081, U.S. patent application Ser. No. 60/249,320, filed Nov. 16, 2000, entitled ELECTRIC FIELD COMPARTMENT SENSING SYSTEM, U.S. patent application Ser. No. 60/310,344, filed Aug. 6, 2001, entitled VEHICLE COMPARTMENT OCCUPANCY DETECTION SYSTEM, and U.S. patent application Ser. No. 60/326,373, filed Oct. 1, 2001, entitled VEHICLE COMPARTMENT OCCUPANCY DETECTION SYSTEM, which are incorporated by reference in their entireties herein.

While described as mounted in the handle assembly, the light assemblies or the light directing members may be molded with either the handle portion or the base portion, for example by co-injection molding. The handle portion or base portion may be manufactured via an integral co-injection molding operation, where the base or handle portion are molded in a single molding machine. For example, the light assembly may be positioned within a cavity of the molding machine while the material forming the base or handle portion is injected into the mold to form the handle or base portion around the light assembly. The light assembly is positioned such that its wires or wire terminals extend through the wall of the mold so they will extend from the finished part for later connection with the corresponding wiring. In addition, the number of light assemblies may be increased or decreased as needed and, furthermore, may be arranged in a pattern. Alternately, a selected light or light sources may be oriented or adapted to direct light downwardly to illuminate the door or the ground area adjacent the door of the vehicle. Therefore, the present invention provides a handle assembly with one or more light assemblies that can be quickly and easily installed in a vehicle at a manufacturing plant. Furthermore, the handle assembly of the present invention may incorporate various electrical components, including electrical components that provide input to a vehicle logic control system for locking or unlocking latching mechanisms for doors, tailgates, or trunks.

As briefly mentioned, the handle assemblies of the present invention may incorporate a wide variety of additional components. Additional components may include antennas, including global positioning system (GPS) or cellular phone antennas or an antenna for a passive entry system, transmitters and/or receivers, such as garage door openers, including a HOMELINK® system, a camera, such as for a rear-vision aid system, sensors, or a side or close object detection system, which includes one or more sensors, such as a radar, including a Doppler radar, an ultrasound sensor, or an infrared sensor. For examples of other features that may be incorporated into the handle assemblies of the present invention, reference is made herein to U.S. provisional Pat. Application entitled VEHICLE HANDLE ASSEMBLY, Ser. No. 60/302,099, filed Jun. 29, 2001.

Although the handle is shown and described as a strap-type handle, it is envisioned that the handle may be any other type of handle, such as a paddle-type handle or the like, such as disclosed in U.S. patent application Ser. No. 09/597,532, filed Jun. 20, 2000, for VEHICLE DOOR HANDLE, now U.S. Pat. No. 6,349,450, which is hereby incorporated herein by reference, without affecting the scope of the present invention.

Optionally, the handle assembly may also or otherwise include an antenna such as described in copending application entitled VEHICLE DOOR HANDLE, Ser. No. 09/597,532, filed Jun. 20, 2000, now U.S. Pat. No. 6,349,450, which is incorporated by reference herein in its entirety, a sensor or sensors, such as an imaging array sensor (such as of the type disclosed in U.S. Pat. Nos. 5,670,935 and 5,550,677, which are hereby incorporated herein by reference), a camera, a Doppler radar sensor, a side object detection and/or monitoring sensor, such as an ultrasonic sensor or infrared sensor or the like (such as, for example, the type disclosed in U.S. patent application, Ser. No. 09/793,002, filed Feb. 26, 2001, by Schofield et al. for VIDEO MIRROR SYSTEMS INCORPORATING AN ACCESSORY MODULE, now U.S. Pat. No. 6,690,268, which is hereby incorporated herein by reference), or other sensing or detecting means. The sensing means may be positioned, such as by molding, within the handle portion and/or within the base portion of the handle assembly and may sense or detect objects exterior of the vehicle. The sensing means may then be operable to communicate a signal to a display system, alert or warning system, security system, or other receiving system which receives such a signal and functions in response to the signal. The signal may be communicated via any known means, such as via a wire connection, such as cables, wires, fiber optic cables or the like, or wirelessly, such as via a radio frequency signal, an infrared signal, or other wireless signaling means.

Therefore, the present invention provides a door handle assembly which includes one or more light assemblies within the handle assembly for illuminating the cup area of the handle assembly. Furthermore, since the light assemblies of the present invention are not relegated to a planar mounting arrangement and, instead, are flexible and can be individually adjusted to suit the surface topology, such as the curved surface of the cup area, either by physical manipulation and/or by optical manipulation, the present invention provides enhanced and a more aesthetically appealing lighting arrangement. In addition, the components of the light assembly or light assemblies can be varied to accommodate a variety of applications and to simplify the manufacturing and assembly process.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which I claim an exclusive property right or privilege are defined as follows:

1. A handle assembly for a vehicle, said handle assembly comprising:

a base portion adapted to mount to a vehicle said base portion having a recessed portion defining a finer cup area;

a handle portion movably mounted to said base portion, said handle portion being adapted for connecting a vehicle latching mechanism; and a light assembly including a light directing member, at least one light source, and a circuit board, said circuit board powering said light source, said light source optically coupled with said light directing member and further mechanically connected with said light directing member wherein said light directing member and said light source comprise a self-contained light assembly, said light assembly incorporated into said handle portion or said recessed portion for lighting said cup area when said light source is actuated and said light directing member conduiting light from said light source and projecting the light in a light pattern whereby at least a portion of said cup area is illuminated with light.

2. The handle assembly according to claim 1, wherein said base portion includes said light assembly.

3. The handle assembly according to claim 2, wherein said base portion includes a plurality of said light assemblies.

4. The handle assembly according to claim 2, wherein said cup area of said base portion includes said light assembly.

5. The handle assembly according to claim 3, wherein said plurality of light assemblies are interconnected to form a light assembly unit.

6. The handle assembly according to claim 1, wherein said light directing member comprises a light pipe.

7. The handle assembly according to claim 6, wherein said light directing member comprises an acrylic light pipe.

8. The handle assembly according to claim 1, wherein said light directing member includes a recess, said light source positioned and optically coupled with said light directing member at said recess.

9. The handle assembly according to claim 8, wherein said light source comprises a light source chosen from a light emitting diode, a fluorescent light, an incandescent light, and an electroluminescent light.

10. The handle assembly according to claim 9, wherein said light source comprises a light emitting diode.

11. The handle assembly according to claim 9, wherein said light source comprises a plurality of light emitting diodes.

12. The handle assembly according to claim 8, wherein said light source and said circuit board are positioned in said recess and mechanically connected with said light directing member wherein said light directing member, said light source, and said circuit board comprise a self-contained light assembly.

13. The handle assembly according to claim 12, wherein said circuit board includes a power regulator circuit for regulating the voltage to said light source.

14. The handle assembly according to claim 12, wherein said light source is mounted to said circuit board.

15. A handle assembly for a vehicle, said handle assembly comprising:
a base portion adapted to mount to a vehicle, said base portion having a recessed portion defining a finger cup area;
a handle portion movably mounted to said base portion, said handle portion being adapted for connecting a vehicle latching mechanism; and
a light assembly including a light directing member and at least one light source, said light source optically coupled with said light directing member and further mechanically connected with said light directing member wherein said light directing member and said light source comprise a self-contained light assembly, said light assembly incorporated into said handle portion or said recessed portion for lighting said cup area when said light source is actuated, and said light directing member conduiting light from said light source and projecting the light in a light pattern whereby at least a portion of said cup area is illuminated with light, wherein said base includes a plurality of said light assemblies, said plurality of light assemblies being interconnected to form a light assembly unit, wherein at least one of said light assemblies includes a circuit board for supplying power to at least one of said light sources.

16. A handle assembly for a vehicle, said handle assembly comprising:
a base portion adapted to mount to a vehicle, and said base portion having a recessed portion defining a finger cup area;
a handle portion movably mounted to said base portion, said handle portion being operable for latching or unlatching a vehicle latching mechanism via movement of said handle portion relative to said base portion; and
a light assembly comprising a light source, a circuit board, and a light pipe adapted to direct light from said light source through said base portion for illuminating at least a portion of said cup area, said circuit board electrically connecting said light source with a vehicle electrical system, and said light pipe including a recess, said light source and said circuit board being mechanically connected with said light pipe at said recess wherein said light pipe, said circuit board, and said light source comprise a self-contained light assembly.

17. The handle assembly according to claim 16, wherein said light source comprises one of a light emitting diode, a fluorescent light, an incandescent light, and an electroluminescent light.

18. The handle assembly according to claim 16, wherein said light pipe includes an engagement surface for engagement by said base portion.

19. The handle assembly according to claim 18, wherein said light source comprises a light emitting diode.

20. The handle assembly according to claim 19, said circuit board comprising a power regulating circuit for adapting a vehicle electrical power supply for driving said light emitting diode.

21. The handle assembly according to claim 16, wherein said light assembly further comprises an electrical connector for coupling to said vehicle electrical system.

22. The handle assembly according to claim 18, wherein said base portion includes a coupler for engaging said engagement surface of said light pipe for securing said light assembly to said base portion.

23. The handle assembly according to claim 22, wherein said coupler comprises a snap-fit coupler.

24. The handle assembly according to claim 16, wherein said light assembly comprises a portion of said base portion.

25. A handle assembly for a vehicle, said handle assembly comprising:
a base portion adapted to mount to a vehicle, said base portion having a recessed portion defining finger cup area;
a handle portion movably mounted at said base portion;
a light source; and
a part of said handle portion being adapted to receive and optically couple with said light source, said light source radiating light into said part when said light source is powered, and said part projecting a pattern of light from said light source whereby at least a portion of the cup area is illuminated, said part comprising a light pipe, said light pipe including a recess, said light source optically coupling with said light pipe at said recess.

26. The handle assembly according to claim 25, wherein said light source is mechanically connected with said light pipe at said recess.

27. The handle assembly according to claim 26, further comprising a circuit board, said circuit board powering said light source.

28. The handle assembly according to claim 27, wherein said light source is mounted to said circuit board.

29. The handle assembly according to claim 27, wherein said circuit board and said light source are positioned in said recess.

30. The handle assembly according to claim 25, wherein said light source comprises one of a light emitting diode, a fluorescent light, an incandescent light, and an electroluminescent light.

31. The handle assembly according to claim 25, wherein said part comprises a unitary integral part of said handle portion.

* * * * *

UNITED STATES PATENT AND TRADEMARK OFFICE
CERTIFICATE OF CORRECTION

PATENT NO. : 6,848,818 B2  
APPLICATION NO. : 10/272900  
DATED : February 1, 2005  
INVENTOR(S) : David J. Huizenga Page 1 of 1

It is certified that error appears in the above-identified patent and that said Letters Patent is hereby corrected as shown below:

Column 10:  
Line 57, Claim 1, Insert --,-- after "vehicle".  
Line 58, Claim 1, "finer" should be --finger--.

Column 11:  
Line 5, Claim 1, Insert --;-- after "actuated".

Column 12:  
Line 51, Claim 25, Insert --a-- after "defining".

Signed and Sealed this

Third Day of June, 2008

JON W. DUDAS  
*Director of the United States Patent and Trademark Office*